US008938936B2

(12) United States Patent
Vietz et al.

(10) Patent No.: US 8,938,936 B2
(45) Date of Patent: Jan. 27, 2015

(54) METHOD AND DEVICE FOR DOSING AND PACKAGING POLYSILICON CHUNKS AND DOSING AND PACKAGING UNIT

(75) Inventors: Matthias Vietz, Mattighofen (AT); Rainer Hoelzlwimmer, Neuoetting (DE); Bruno Lichtenegger, Emmerting (DE)

(73) Assignee: Wacker Chemie AG, Munich (DE)

( * ) Notice: Subject to any disclaimer, the term of this patent is extended or adjusted under 35 U.S.C. 154(b) by 571 days.

(21) Appl. No.: 13/357,643

(22) Filed: Jan. 25, 2012

(65) Prior Publication Data

US 2012/0198793 A1 Aug. 9, 2012

(30) Foreign Application Priority Data

Feb. 9, 2011 (DE) .......................... 10 2011 003 875

(51) Int. Cl.
*B65B 1/32* (2006.01)
*B07B 1/00* (2006.01)

(52) U.S. Cl.
USPC ................... 53/502; 53/449; 53/450; 53/545; 53/550; 53/553; 141/83; 209/233

(58) Field of Classification Search
USPC ........... 53/449, 450, 451, 502, 545, 550, 551, 53/170, 173, 553; 141/83; 209/233
See application file for complete search history.

(56) References Cited

U.S. PATENT DOCUMENTS

| | | | |
|---|---|---|---|
| 4,592,193 A * | 6/1986 | Gustavsson ..................... 53/530 |
| 4,759,887 A * | 7/1988 | Geissler et al. ............... 264/414 |
| 4,813,205 A | 3/1989 | Mikata et al. |
| 4,947,605 A * | 8/1990 | Ramsey .......................... 53/442 |
| 5,122,262 A * | 6/1992 | Summers ....................... 209/321 |
| 5,699,649 A * | 12/1997 | Abrams et al. ................... 53/428 |
| 5,855,232 A * | 1/1999 | Oda et al. ......................... 141/83 |
| 5,919,303 A * | 7/1999 | Holder ............................. 117/13 |
| 6,375,011 B1 * | 4/2002 | Flottmann et al. ............ 209/261 |

(Continued)

FOREIGN PATENT DOCUMENTS

DE 3640520 A1 6/1988
DE 10204570 A1 9/2003

(Continued)

OTHER PUBLICATIONS

Abstract for JP 51-37792 / JP 57-22804, Mar. 30, 1976.

(Continued)

*Primary Examiner* — Christopher Harmon
(74) *Attorney, Agent, or Firm* — Caesar, Rivise, Berstein, Cohen & Pokotilow, Ltd.

(57) ABSTRACT

Disclosed is a method for dosing and packaging polysilicon chunks, wherein a product flow of polysilicon chunks is transported via a feed channel, separated by at least one screen into coarse and fine chunks, weighed and dosed to a target weight by a dosing balance, discharged via a discharge channel and transported to a packaging unit where a first plastic bag is filled with the polysilicon chunks and sealed, the plastic bag containing polysilicon chunks being packaged with a further plastic bag which is formed by a shaper and subsequently welded, wherein the at least one screen and the dosing balance at least partially include a hard metal on their surfaces and the shaper for forming the plastic bag includes a wear-resistant coating. Also disclosed are a dosing unit, a packaging unit and a device for dosing and packaging polysilicon chunks, which contains a dosing unit and a packaging unit.

9 Claims, 2 Drawing Sheets

(56) References Cited

U.S. PATENT DOCUMENTS

| | | | |
|---|---|---|---|
| 6,494,023 B2 * | 12/2002 | DelDuca et al. | 53/511 |
| 6,811,530 B2 * | 11/2004 | Watanabe et al. | 493/269 |
| 6,874,713 B2 * | 4/2005 | Arvidson et al. | 241/1 |
| 7,013,620 B2 * | 3/2006 | Holzlwimmer et al. | 53/449 |
| 8,074,905 B2 * | 12/2011 | Schaefer et al. | 241/1 |
| 8,535,614 B2 * | 9/2013 | Chu | 422/199 |
| 8,671,647 B2 * | 3/2014 | Boothe et al. | 53/111 R |
| 2003/0172624 A1 | 9/2003 | Bartel et al. | |
| 2005/0034430 A1 | 2/2005 | Holzlwimmer et al. | |
| 2006/0088970 A1 | 4/2006 | Hesse et al. | |
| 2010/0001106 A1 | 1/2010 | Schaefer | |
| 2010/0154357 A1 | 6/2010 | Wochner et al. | |

FOREIGN PATENT DOCUMENTS

| | | |
|---|---|---|
| DE | 102007027110 A1 | 12/2008 |
| EP | 1334907 A1 | 8/2003 |
| EP | 1645333 A1 | 4/2006 |
| JP | 51037792 A2 | 3/1976 |
| JP | 57022804B B4 | 5/1982 |
| JP | 2009544564 T2 | 12/2009 |

OTHER PUBLICATIONS

PatBase abstract for DE 3640520 A1, Jun. 9, 1988.
PatBase abstract for DE 10204570 A1, Sep. 11, 2003.

* cited by examiner

METHOD AND DEVICE FOR DOSING AND PACKAGING POLYSILICON CHUNKS AND DOSING AND PACKAGING UNIT

BACKGROUND OF THE INVENTION

The invention relates to a method and a device for dosing and packaging polysilicon chunks, and to a dosing unit and a packaging unit for a device for dosing and packaging polysilicon chunks.

Fragmented polysilicon is, for example, deposited from trichlorosilane by means of the Siemens method and then ideally comminuted contamination-free. A method for automatic breaking and a corresponding device are described in EP 1 645 333 A1.

For applications in the semiconductor and solar industries, minimally contaminated fragmented polysilicon is desired. For this reason, the material should also be packaged with low contamination before it is transported to the customer.

Conventionally, fragmented polysilicon for the electronics industry is packaged in 5 kg bags with a weight tolerance of +/−max. 50 g. For the solar industry, fragmented polysilicon in bags with a weigh-in of 10 kg and a weight tolerance of +/−max. 100 g is usual.

Tube bagging machines, which are suitable in principle for the packaging of fragmented silicon, are commercially available. A corresponding packaging machine is described, for example in DE 36 40 520 A1.

Fragmented polysilicon is a sharp-edged, non-flowable bulk material with a weight of up to 2500 g for the individual Si chunks. During packaging, it is therefore necessary to take care that the material does not pierce, or in the worst case even entirely destroy, the conventional plastic bags when they are being filled. In order to prevent this, commercially available packaging machines need to be suitably modified for the purpose of packaging polysilicon.

With commercially available packaging machines, it is generally not possible to comply with the purity requirements which are demanded of fragmented polysilicon, since the conventionally used composite films can lead to increased contamination of the fragmented polysilicon owing to the chemical additives.

EP 1 334 907 B1 discloses a device for the low-cost automatic transportation, weighing, portioning, filling and packaging of high-purity fragmented polysilicon, comprising a feed channel for the fragmented polysilicon, a weighing device for the fragmented polysilicon, which is connected to a funnel, deflection plates made of silicon, a filling device which forms a plastic bag from a high-purity plastic film and comprises a deionizer which prevents static charging and therefore particle contamination of the plastic film, a welding device for the plastic bag filled with fragmented polysilicon, a flowbox which is arranged above the feed channel, weighing device, filling device and welding device and prevents particle contamination of the fragmented polysilicon, and a conveyor belt with a magnetically inductive detector for the welded plastic bag filled with fragmented polysilicon, all the components which come in contact with the fragmented polysilicon being sheathed with silicon or clad with a highly wear-resistant plastic.

Means for portioning the fragmented polysilicon are, for example, a time-controlled feed channel or filling level determination of a storage container or a weighing device for the fragmented polysilicon. A corresponding weighing device is known, for example, from U.S. Pat. No. 4,813,205.

The device according to EP 1 334 907 B1 is intended to allow low-contamination packaging without human contact. The low-contamination packaging is intended, in particular, to be achieved by sheathing the internal components with silicon or with a highly wear-resistant plastic.

However, it has been found that specifically the portioning of fragmented polysilicon by a procedure according to EP 1 334 907 B1 is problematic. An exact 10 kg weigh-in of fragmented polysilicon with a tolerance of +/−100 g is not possible by means of this device. This applies in particular to chunks with sizes of 50-130 mm.

Furthermore, the overall arrangement has been found to be mechanically not very stable owing to the sheathing of all parts, which come in contact with silicon, with silicon or plastic. The relatively high wear of the silicon and plastic coatings makes the packaging machine extremely maintenance-intensive.

DE 10 2007 027 110 A1 discloses a device for packaging fragmented polycrystalline silicon or polysilicon granulate, consisting of a rotary machine, a filling machine and a sealing machine or a non-circularly arranged device comprising a filling station and a sealing station, in which a PE bag is suspended from a gripper system and moved from station to station in a timed sequence, characterized in that the filling station comprises a freely suspended energy absorber consisting of a low-contamination nonmetallic material, which is introduced into the PE bag before the PE bag is filled with polycrystalline silicon and is removed from the PE bag after the PE bag has been filled with polycrystalline silicon, and the filled PE bag is carried forward by means of the gripper system into the sealing station and sealed there.

DE 10 2007 027 110 A1 also describes a method for packaging polycrystalline silicon, in which a freely suspended ready-formed bag is filled with polycrystalline silicon by means of a filling device, the filled bag subsequently being sealed, characterized in that the bag consists of high-purity plastic with a wall thickness of from 10 to 1000 µm. Preferably, the sealed plastic bag filled with polycrystalline silicon is introduced into a further plastic bag made of PE with a wall thickness of from 10 to 1000 µm and this second plastic bag is sealed.

According to DE 10 2007 027 110 A1, the polysilicon is first portioned then weighed before the packaging. The portioning and weighing in of the fragmented polysilicon are carried out by means of a manual or automatic method known from the prior art. With respect to automatic portioning, the device known from EP 1 334 907 B1 is mentioned, although it has the disadvantages described above.

In order to achieve the required high weigh-in accuracy of less than +/−1% for fragmented polysilicon in the semiconductor industry, labor-intensive manual packaging of the cleaned polysilicon chunks in a class 100 cleanroom is necessary. In this case cleaned polysilicon chunks, which no longer have any metallic impurities on the surface, are taken using high-purity gloves, for example high-purity textile, PU or PE gloves, from a process vessel, in which the cleaning takes place, and introduced into a double PE bag. When handling with the gloves, however, the content of plastic and metal particles in the fragmented polysilicon increases owing to the glove abrasion and the general handling by the workers. Nevertheless, the manual method still satisfies the purity requirements in relation to the metal surface values for the electronics industry.

Furthermore, automatic weight correction is provided by re-weighing the filled and welded PE bags and removing the relevant bags if the weight is too high or too low, the weight being manually corrected for bags with the wrong weigh-in by optionally re-cleaning the polysilicon and filling a new bag with it, then welding the bag.

As an alternative, differential weighing of the process vessel is carried out before and after emptying; if there is a weight error of +/−50 g, the method is automatically stopped and the operators carry out manual correction. The PE bag is subsequently filled.

The welding of the PE bag is carried out according to DE 10 2007 027 110 A1 with a hot-seal welder, in which the metallic welding wire is clad with a nonmetallic material, for example polytetrafluoroethylene (PTFE).

It has been found that weld seams which have folds are often formed in this way. This is frequently the case in particular for the second bag and for chunks with a size of from 50 to 130 mm. For this reason, secure handling and secure transport to the customer cannot always be ensured.

The prior art thus often provides manual weight correction or even manual packaging of polysilicon, in order to be able to comply with the required weigh-in tolerances. Automatic dosing devices have proven mechanically unstable. Fold-free welding of the second bag is not achieved with the methods known from the prior art.

The object of the invention is based on these problems.

DESCRIPTION OF THE INVENTION

The object of the invention is achieved by a method for dosing and packaging polysilicon chunks, wherein a product flow of polysilicon chunks is transported via a feed channel, separated by means of at least one screen into coarse and fine chunks, weighed and dosed to a target weight by means of a dosing balance, discharged via a discharge channel and transported to a packaging unit where a first plastic bag is filled with the polysilicon chunks and welded, wherein this plastic bag containing polysilicon chunks is packaged by means of a further plastic bag which is formed by a shaper and is subsequently welded, wherein the at least one screen and the dosing balance at least partially comprise a hard metal on their surfaces and the shaper for forming the plastic bag comprises a wear-resistant coating.

The invention also relates to a dosing unit for a device for dosing and packaging polysilicon chunks, comprising a feed channel suitable for delivering a product flow of chunks, at least one screen suitable for separating the product flow into coarse and fine chunks, a coarse dosing channel for coarse chunks and a fine channel for fine chunks, and a dosing balance for determining the dosing weight, wherein the at least one screen and the dosing balance at least partially comprise a hard metal on their surfaces.

The dosing unit according to the invention is part of a device for dosing and packaging polysilicon chunks.

The dosing unit is used to dose polysilicon chunks of a particular size class as exactly as possible before the packaging.

For example, exactly 10 kg of polysilicon chunks are intended to be weighed out and dosed by means of the dosing unit.

By separating the product flow into coarse and fine parts, more accurate dosing of the polysilicon is possible.

This weighed-out quantity of polysilicon chunks is packaged in at least one film bag after the dosing and an optional cleaning step.

The dosing unit preferably comprises a fine component chute which can be swiveled into the coarse dosing channel.

The dosing unit comprises at least one screen, preferably a grille screen, suitable for separating the chunks of the initial product flow into a coarse dosing channel and a fine dosing channel.

The dosing unit preferably comprises two screens, for example grille screens.

Coarse, or larger, polysilicon chunks are transported in a coarse dosing channel.

Fine, or smaller, polysilicon chunks are transported in a fine dosing channel.

The size distribution of the polysilicon chunks in the starting product flow depends, inter alia, on the preceding comminution processes. The nature of the division into coarse and fine chunks and the size of the coarse and fine chunks depend on the desired end product, which is to be dosed and packaged.

A typical chunk size distribution comprises chunks with sizes of 50-130 mm.

For example, chunks below a particular size can be discharged from the dosing unit by means of a screen in conjunction with a discharge channel. The effect achievable by this is that only chunks of a very particular size class are dosed.

The discharged smaller chunks are reclassified in downstream processes, dosed and packaged or sent for a different use.

The dosing unit preferably comprises a fine component chute. This may be configured in a swivelable fashion. Depending on the desired target product (chunk size distribution), this will be used to screen out fine components and separate them from the product flow for the fine dosing.

The dosing of the polysilicon by means of the two dosing channels may be automated.

What is essential to the invention is the use of hard metal elements for the screen and dosing balance.

In contrast to EP 1 334 907 B1, not all parts coming in contact with fragmented polysilicon are clad with silicon or plastic.

At least the screen and the dosing balance must at least partially comprise hard metal on their surfaces.

Hard metals are intended to mean sintered carbide hard metals. Besides the conventional hard metals based on tungsten carbide, there are also hard metals which only contain titanium carbide and titanium nitride as hard materials, in which case the binder phase contains nickel, cobalt and molybdenum. Their use is also preferred in the scope of the method according to the invention.

Preferably, at least the mechanically stressed wear-sensitive surface regions of the screen and the dosing balance comprise hard metal Preferably, the at least one screen is made entirely of hard metal.

The screen and the dosing balance may be provided with a coating partially or over their entire surface. A material selected from the group consisting of titanium nitride, titanium carbide, aluminum titanium nitride and DLC (diamond-like carbon) is preferably used as the coating.

It has been found that the use of hard metal elements improves the mechanical stability of the dosing unit.

The maintenance interval of the dosing unit also becomes much longer, since the hard metal elements wear less than the silicon and plastic claddings used in the prior art.

Surprisingly, it has been found that the contamination of silicon by the use of hard metal is not increased significantly compared with the use of silicon or plastic claddings. This applies particularly to the contamination with tungsten and cobalt.

While DE 36 40 520 A1 uses agitators and dosing screws for the dosing and U.S. Pat. No. 4,813,205 tries to achieve exact dosing by rejecting prefilled containers, the dosing unit according to the invention makes do with a simple linear drive.

The device according to the invention is suitable for exactly dosing 10 kg of polysilicon chunks with an edge length of from 1 to 150 mm and a weight of from 0.1 to 600 g with an accuracy of +/−90 g.

The dosing unit furthermore makes it possible to distribute the silicon product flow between a plurality of dosing and packaging systems by means of a controlled swiveling channel, and therefore a combination of a plurality of dosing systems which are filled with a starting product, and after dosing and weighing are transported to different packaging machines.

The dosing system contains separating mechanisms (screens) which screen off undesired smaller product sizes and then feed these to the upstream processes (screening, classification).

The object of the invention is also achieved by a packaging unit for a device for packaging polysilicon chunks, containing a shaper suitable for forming a plastic bag from a high-purity plastic film, and a device for sealing the plastic bag, wherein the shaper for forming the plastic bag comprises a wear-resistant coating.

A material selected from the group consisting of titanium nitride, titanium carbide, aluminum titanium nitride and DLC (diamond-like carbon) is preferably used as the wear-resistant coating of the shaper.

The structure of an aforementioned packaging unit preferably corresponds in principle to the structure of a vertical packaging machine, i.e. the polysilicon is introduced from above into a plastic bag.

After exact dosing of polysilicon by means of a dosing unit according to the invention, the polysilicon is preferably introduced vertically into a plastic bag formed by means of a shaper. The plastic bag is subsequently sealed.

The introduction of the polysilicon and the welding of the plastic bag are carried out in a similar way to the device according to EP 1 334 907 B1, although the filling device described therein is clad with silicon or plastic while the shaper of the packaging unit according to the invention comprises a wear-resistant coating.

A filling device suitable for this, as described in DE 10 2007 027 110 A1, may also comprise a freely suspended energy absorber which is introduced into the inner plastic bag before the latter is filled with the polycrystalline silicon. The plastic bag is filled with the polycrystalline silicon through the energy absorber. The freely suspended energy absorber is subsequently removed from the plastic bag filled with polycrystalline silicon, and the plastic bag is sealed.

The sealing of the first plastic bag may for example be carried out by means of welding, adhesive bonding or form fit. It is preferably carried out by means of welding.

Before the welding, the air is preferably sucked out of the bag until a flat bag containing little air is obtained.

Before the packaging, the polysilicon is first portioned and weighed. This is followed by portioning and weighing in the fragmented polysilicon by means of a dosing unit according to the invention.

The inner bag ideally consists of a plastic film with a thickness of 100-500 μm.

A monofilm of LD-PE, LLD-PE or HD-PE is preferably used as the plastic. It is likewise possible to use multilayer films from blow extrusion or casting methods.

The inner bag is provided with a single, double or triple weld seam on the head, bottom and on the longitudinal seal.

The wear-resistant coating of the shaper prevents contamination of the inside of the bag.

In order to package silicon in two bags, as is conventional, a second packaging unit is required.

According to the invention, the packaging with the second bag is carried out in an aforementioned packaging unit, but in this case with a horizontal structure.

The second plastic bag is formed while an already sealed first plastic bag containing polysilicon is introduced horizontally into the second plastic bag by means of a feed channel or other suitable transport units. The second plastic bag is subsequently sealed.

Abrasion and piercing by larger silicon chunks, as are often observed in the case of vertical packaging machines, can be prevented by the horizontal packaging.

By means of a tube preformer or blowing air in, or a film spreader or—which is particularly preferred—by a combination thereof, fold-free forming of the bag is achieved.

Instead of the film spreader, it is also possible to use driven plastic wheels or metal clamps.

The formed, longitudinally sealed and horizontally arranged film tube is preferably pressed flat by means of shaping tubes arranged below and above.

After the plastic bag is filled, it is preferably welded by means of two shaped jaws.

The sealing device/sealing station is preferably a welding device, particularly preferably a hot-seal welder based on a heated welding wire, which is preferably clad with a nonmetallic material, for example polytetrafluoroethylene (PTFE).

It has been found that fold-free transverse sealing is not possible in the case of large silicon chunks (50-130 mm) without the aforementioned measures.

As an alternative, a fold-free weld seam may also be achieved by lowering the conveyor belt or the transport unit after a transverse welding jaw.

To this end, shortly before the transverse welding jaw is closed, the conveyor belt is lowered until the inner bag can slide in the outer bag as far as the already formed weld seam.

The film tube is thereby drawn over the edge of the welding jaw and a fold-free weld seam is formed.

In addition, the outer bag may also be shorter than in the variant described above owing to the defined position of the inner bag.

The outer bag preferably likewise consists of one of the aforementioned plastic films from flat web manufacture.

It is formed by means of the secondary packaging machine and likewise sealed with a single, double or triple weld seam. A gripping hole for easy removal from the packaging machine may also be stamped above the weld seam.

The packaging machine may also be equipped with an automatic controller for congruent alignment of the film for a symmetrical fin seam.

A product label may be applied onto the inner bag and onto the outer bag.

A barcode or a data matrix code may be printed on this label.

It is also possible to use RFID labels.

The labels additionally have so-called tear-off tabs by which labels can be removed easily.

With the method according to the invention, it is possible for the first time to dose large silicon chunks (50-130 mm) within the desired tolerances.

It has been possible to achieve this by a dosing line which is driven in different dosing modes by means of gravimetric and timed processes.

The provision of hard metal claddings, for example in the dosing balance, has proven essential to the invention in this case.

Separation of the undesired fine material by means of particularly adapted screen geometries is particularly advantageous.

The method according to the invention is much simpler than the methods according to the prior art.

To date, exact dosing has involved weighing prefilled containers and then combining them. Conversely, the method according to the invention makes do with a single storage container and, for the dosing, employs separation of the material into coarse and fine dosing product flows.

Agitators or dosing screws, as have sometimes been used in the prior art, are not necessary.

Those parts of all the screens which touch the product are preferably made of hard metal.

By virtue of suitable selection of the hard metal, the superficial product contamination by tungsten and cobalt is not significantly higher than in the case of silicon or plastic claddings.

Particularly, however, the lower wear of the hard metal parts is advantageous.

The material distribution is preferably carried out by means of a controller which is driven by means of volumetric or gravimetric input parameters.

With this controller, it is possible to constantly feed product flows and distribute them between an appropriate number of dosing and packaging systems.

During production shutdown, the corresponding module is not operated.

The input parameters for achieving exact dosing should be specified by means of a control algorithm.

A particular advantage of the method according to the invention is that large cost savings can be achieved, because otherwise undesired fine material can be processed further.

The method permits exact dosing of the polysilicon with error rates of less than 1%.

Further cost savings can be achieved owing to the hardness of the hard metal parts used, through obviation of the replacement intervals of the silicon-sheathed cladding parts.

The outer bag can be welded fold-free, which increases the process reliability.

BRIEF DESCRIPTION OF THE DRAWINGS

The invention will be explained below with the aid of FIGS. 1 to 3.

Figure 1:
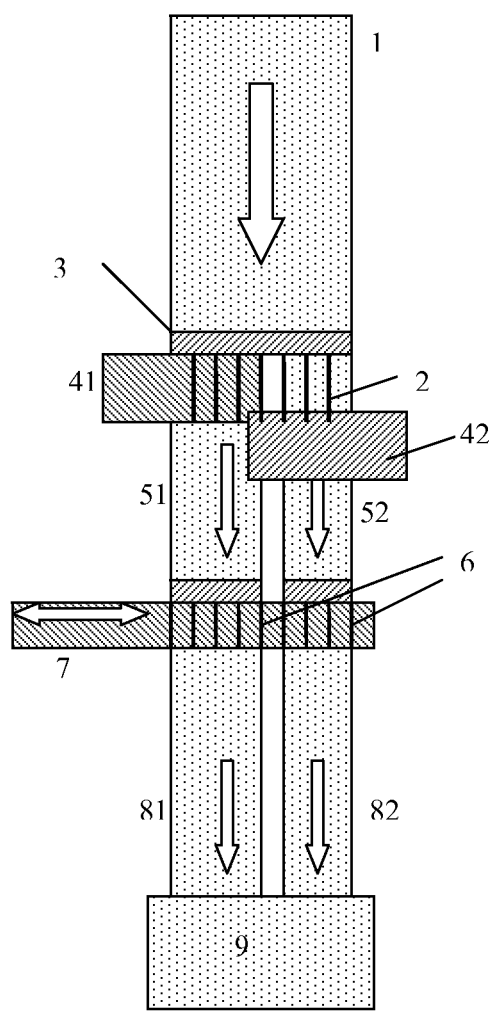
FIG. 1 schematically shows a device for exact dosing and for separation of undesired small product sizes.

LIST OF REFERENCES USED 1 input channel
2 grille screen for separation of the material for coarse and fine dosing
3 hard metal element
41 swivelable fine component chute (depending on the target product)
42 element for feeding the unscreened part of the product flow into the coarse dosing channel
51 coarse dosing channel rear
52 fine dosing channel rear
6 replaceable grille screens for separation of undesired small product sizes
7 channel for discharge to further processing in upstream production processes
81 coarse dosing channel front
82 fine dosing channel front
9 dosing balance
10 transverse welding jaw
11 film tube
12 air blowing
131 tube preformer top
132 tube preformer bottom
14 film spreader
15 restoring element
16 product FIG. 1 schematically shows a device for exact dosing and for separation of undesired small product sizes.

Fragmented polysilicon, obtained from comminution of silicon ingots produced by means of the Siemens process, is introduced into the input channel 1.

The fragmented polysilicon is in different size classes of from 1 up to 150 mm or larger.

The fragmented polysilicon is separated into two product flows by the grille screen 2: into a product flow with smaller or lighter chunks for fine dosing and into a product flow with larger or heavier chunks for coarse dosing. The grille screen 2 consists of hard metal.

3 shows a hard metal element.

41 shows an optional fine component chute, which can be swiveled. Depending on the desired target product (chunk size distribution), this will be used to screen out fine components and separate them from the product flow for the fine dosing.

42 shows an element for feeding the unscreened part of the product flow into the coarse dosing channel 51.

51 shows a rear part of the coarse dosing channel, in which the product flow for coarse dosing moves.

52 shows the rear part of the fine dosing channel.

6 shows grille screens for separation of undesired smaller chunk sizes.

7 shows a discharge channel for transporting away the smaller chunk sizes separated by means of the grille screen 6. These smaller chunk sizes can be processed further.

81 shows the front part of the coarse dosing channel, and 82 shows the front part of the fine dosing channel.

9 shows a dosing balance.

The fragmented polysilicon transported through the dosing channels is weighed by means of the dosing balance, for example to the target weight of 10 kg.

Figure 2:
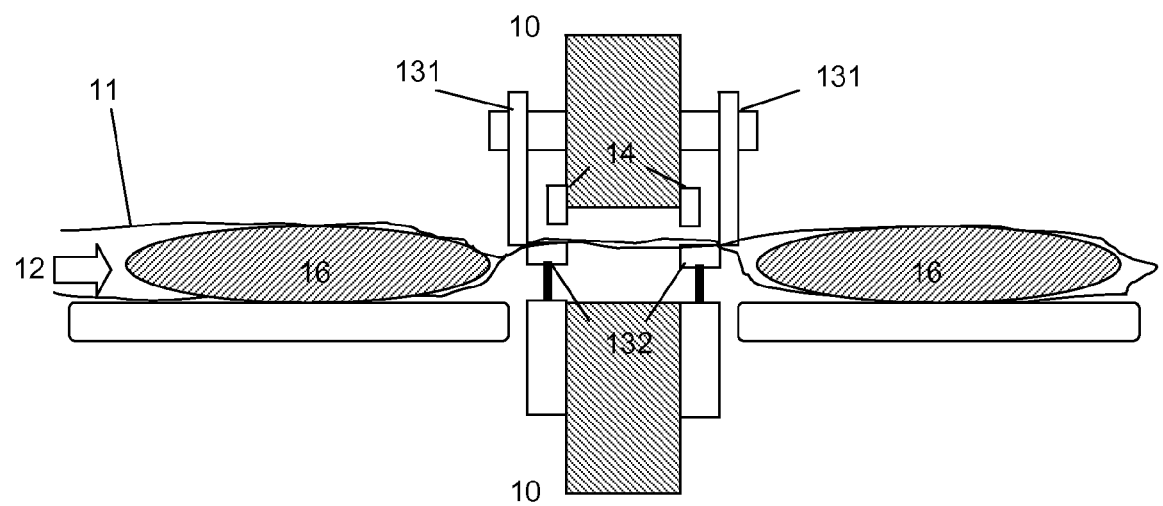
FIGS. 2 and 3 schematically show two views of a horizontal packaging machine for fold-free film welding.
Figure 3:
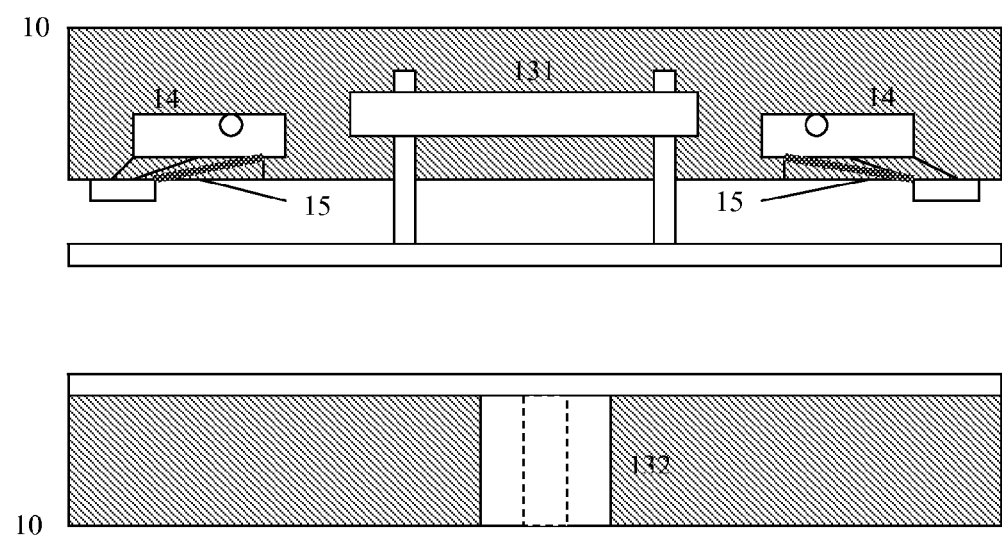

FIGS. 2 and 3 schematically show two views of a horizontal packaging machine for fold-free film welding.

10 shows a transverse welding jaw inside a packaging machine, for sealing fragmented polysilicon in plastic films.

11 shows a film tube.

The film tube is brought into the desired shape by means of the upper tube preformer 131 and by means of the lower tube preformer 132.

14 shows a film spreader.

The film tube is inflated by blowing in air 12.

15 shows a restoring element (for example a spring) for resetting the film spreader.

16 represents the product to be packaged.

What is claimed is:

1. A method for dosing and packaging polysilicon chunks, comprising:
   transporting a product flow of polysilicon chunks via a feed channel;
   separating the product flow into coarse chunks and fine chunks using at least one screen;

weighing and dosing the coarse chunks and the fine chunks using a dosing balance to provide a target weight of polysilicon chunks to be discharged;

discharging the polysilicon chunks to be discharged via a discharge channel to provide discharged polysilicon chunks;

transporting the discharged polysilicon chunks to a packaging unit;

filling a first plastic bag with the discharged polysilicon chunks to provide a filled first plastic bag;

sealing the filled first plastic bag; and packaging the filled first plastic bag in a second plastic bag which is formed by a shaper and is subsequently welded, wherein: (a) the first plastic bag is introduced horizontally into the second plastic bag, (b) the second plastic bag is welded on a conveyor belt by two weldling jaws, (c) the conveyor belt is lowered until the first plastic bag slides in the second plastic bag as far as an already formed weld seam, and then the welding jaws are sealed, (d) surfaces of the at least one screen and the dosing balance at least partially comprise a hard metal, and (e) the shaper for forming the second plastic bag comprises a wear-resistant coating.

2. The method as claimed in claim 1, wherein the discharged polysilicon chunks are introduced vertically into the first plastic bag.

3. The method as claimed in claim 1, wherein the wear-resistant coating of the shaper is selected from the group consisting of titanium nitride, titanium carbide, aluminum titanium nitride and DLC.

4. The method as claimed in claim 1, wherein at least one of a tube preformer, a film spreader and a device suitable for blowing air into the second plastic bag is used for fold-free forming of the second plastic bag.

5. The method as claimed in claim 1, wherein fine material which is contained in the product flow of polysilicon chunks and is not intended to be packaged is separated from the product flow by screening and processed further in production processes.

6. The method as claimed in claim 1, wherein a shaped and horizontally arranged film tube is pressed flat by shaping tubes arranged below and above.

7. The method as claimed in claim 1, wherein the discharged polysilicon chunks are introduced vertically into the first plastic bag; and the wear-resistant coating of the shaper is selected from the group consisting of titanium nitride, titanium carbide, aluminum titanium nitride and DLC.

8. The method as claimed in claim 7, wherein: at least one of a tube preformer, a film spreader and a device suitable for blowing air into the second plastic bag is used for fold-free forming of the second plastic bag; and fine material which is contained in the product flow of polysilicon chunks and is not intended to be packaged is separated from the product flow by screening and processed further in production processes.

9. The method as claimed in claim 7, wherein a shaped and horizontally arranged film tube is pressed flat by shaping tubes arranged below and above.

* * * * *